(12) United States Patent
Dieziger (10) Patent No.: US 8,534,978 B2
(45) Date of Patent: Sep. 17, 2013

(54) SYSTEM FOR LOADING CARGO

(76) Inventor: David Douglas Dieziger, Missoula, MT (US)

( * ) Notice: Subject to any disclaimer, the term of this patent is extended or adjusted under 35 U.S.C. 154(b) by 903 days.

(21) Appl. No.: 12/615,429

(22) Filed: Nov. 10, 2009

(65) Prior Publication Data

US 2011/0110753 A1    May 12, 2011

(51) Int. Cl.
    *B60P 1/64*    (2006.01)
(52) U.S. Cl.
    USPC .......................................... 414/500; 414/538
(58) Field of Classification Search
    USPC .................................................. 414/500, 538
    See application file for complete search history.

(56) References Cited

U.S. PATENT DOCUMENTS

| | | | |
|---|---|---|---|
| 3,049,378 A * | 8/1962 | Nelson | 298/14 |
| 3,159,295 A * | 12/1964 | Love | 414/494 |
| RE26,546 E | 3/1969 | Rasmussen | |
| 5,269,642 A * | 12/1993 | Zoromski | 414/392 |
| 5,556,249 A | 9/1996 | Heine | |
| 5,755,549 A * | 5/1998 | Ogrodnick | 414/500 |
| 5,779,431 A | 7/1998 | Alm et al. | |
| 5,921,742 A | 7/1999 | Gearhart | |
| 6,099,232 A | 8/2000 | Dixon et al. | |
| 6,354,787 B1 | 3/2002 | O'Daniel | |
| 2007/0160450 A1 | 7/2007 | Ehler | |

OTHER PUBLICATIONS

Rizzoni. Principles and Applications of Electrical Engineering. Boston, McGraw Hill, 2000. p. 854.*

* cited by examiner

*Primary Examiner* — Jonathan Snelting
(74) *Attorney, Agent, or Firm* — Lawrence Lambelet (57) ABSTRACT

A simplified apparatus is provided to exploit certain unique characteristics of DC winches, whereby two winches may be cooperatively joined to load and unload a light-duty truck. Since the speed and torque are linearly related in a DC motor, it possible to manipulate certain parameters, such as the resistance of the armature and the mechanical leverage applied to the load, to result in a stable dynamic between two oppositely-directed DC-motor winches. The novel concept avoids the need for controls to coordinate the winches, and no installation is required that would otherwise limit the use of the truck for other purposes.

5 Claims, 7 Drawing Sheets

SYSTEM FOR LOADING CARGO

FIELD OF THE INVENTION

This invention relates to loading and unloading truck beds, and, more particularly, to winching cargo onto and off of light truck beds.

BACKGROUND OF THE INVENTION

Current systems for loading large cargo loads onto the bed of a light truck, such as a pickup truck, are cumbersome and, occasionally, unsafe. Such a load might include a slip-in camper, a heavy piece of equipment, a light-duty vehicle, or, otherwise, a cargo box of out-sized dimension. The cargo load is characterized by size or weight too large to be conveniently handled unaided by one person.

Existing systems use jacks, or hydraulic cylinders, to lift the load off the ground while the vehicle is driven underneath. Such systems are expensive, a nuisance to install or remove, and they take up space on the bed which could otherwise be used for cargo. More importantly, however, there is a risk of a calamitous result.

The driver of the truck has to navigate through the scaffolding suspending the load with limited vision to the rear. The view of the bed or inner fenders from the driver's seat of an extended cab, or crew cab, on a pickup truck, for example, is limited. A collision with the jacks holding up a camper, as an example, could cause the camper to catastrophically collapse.

Means for rigging the load by using a ramp, and thereby avoiding the risk inherent in suspending the load, are known. U.S. Pat. No. 6,099,232 to Dixon, for example, discloses a system for loading a small recreational vehicle, such as a motorcycle, onto a light truck. The system involves an installation of rails on the truck bed, a pallet to move laterally on the rails and pivotally at the distal end thereof to provide a ramp, and a carriage to contain the load and move it onto the sled. Loading is accomplished by two winches manipulating the carriage onto the pallet and tipping the pallet onto the rails. Lateral movement on the bed, however, requires a manual effort to shove the load forward or rearward.

The rails and pallet of Dixon, while facilitating the lateral movement of the cargo, otherwise render the truck bed unusable for other purposes. The installed structure could be eliminated by using a winch, or another power means, to tow the load over the bed. A single winch acting alone is insufficient, however, because it can only force in one direction; that is to say, it can either load or unload.

A pair of winches positioned oppositely along the path of movement can alternately pull in one direction to load or pull in the other direction to unload. While the winches could be selectively engaged by operator control, the challenge is to configure a system where the winches act cooperatively in opposition. The resulting counterbalance provides a braking force to slow the driving winch and control the gravity decent down the ramp. This cooperative action is complicated by the dynamic of the unloading cycle. While moving laterally, friction acts against the pulling winch. During the ramp descent phase, however, gravity acts to precipitately reinforce the pull. The two winches seemingly have the need to communicate with each other.

It is known that microprocessor-based controls can be provided and programmed for automated speed control between opposing winches. Hydraulic winches, in particular, are adaptable to speed control by shunting fluid. Hydraulic winches and sophisticated control mechanisms, however, are too expensive and complex for the ordinary homeowner, or sportsman, experiencing the casual need to boost a heavy load onto a pickup truck.

The instant invention provides the means by which two relatively inexpensive and commonly-available winches can act in opposition while adjusting themselves automatically to balance the net force on the load. The novel approach is distinguished by the absence of a coordinating control mechanism. In another embodiment, a single winch combined with a deadhead anchor and a simple mechanism to maintain winch cable tension is presented.

SUMMARY OF THE INVENTION

It is accordingly an object of the present invention to provide a simplified and low-cost means for loading and unloading a heavy or large cargo onto and off of a light truck.

It is a further object of the present invention to avoid permanently encumbering the cargo space of the truck with loading and unloading equipment and fixtures.

It is a further object of the present invention to provide a winch service to load and unload the cargo over a ramp.

It is a further object of the present invention to accomplish the loading and unloading in a controlled manner by operating two winches in opposition.

It is a further object of the present invention to utilize the characteristic of permanent-magnet DC-motor driven winches, whereby torque and speed are linearly related, to self-is adjust the speed of each winch to a state of dynamic equilibrium.

It is a further object of the present invention to utilize the dynamic braking phenomenon of permanent-magnet DC-motors, whereby the motor reverses to a generator, as a counter-balancing force.

It is a further object of the present invention to change the speed-torque profile of one of the winches, in order to enable an equilibrium speed, by placing a resistance in series with the motor armature.

It is a further object of the present invention to change the speed-torque profile of one of the winches, in order to enable an equilibrium speed, by doubling the purchase of the winch through a mechanical leverage mechanism.

It is a further object of the present invention to provide a simple spring-actuated switch to prevent slack in a winch cable by controlling the power source to the winch.

It is a further object of the present invention to provide an even simpler means for unloading by driving the vehicle out from underneath an anchored load with a winch in reverse countering the pull.

These objects, and others to become apparent through further description, are embodied in an apparatus for loading and unloading the bed of a light truck, comprising a ramp extending from the bed to the ground to form an inclined plane thereto, a load resting on the ground proximate to the ramp, a first winch and cable system attached between the load and the bed and configured to pull the load up the ramp and across the bed, a second winch and cable system attached between the load and the ramp and configured to pull the load off the bed and onto the ramp, and a means for cooperating operative between the first and second winch and cable systems. The means for cooperating regulates the movement of the load along the bed and ramp and against the frictional and gravitational forces encountered thereupon, and wherein said means involves exclusively self-adjustment of the systems.

In the preferred embodiment, the means for cooperating comprises the second winch free-wheeling while the first winch is pulling and the first winch engaging in reverse while the second winch is pulling. Also, in the preferred embodiment, the first and second winches are powered by permanent-magnet DC motors.

In a particular preferred embodiment, the apparatus for loading and unloading further comprises a means for equalizing speeds between the two winches when the second winch is pulling. The means for equalizing speeds comprises motor configurations where the characteristic torque-versus-angular-speed plots converge at a preferred speed. This convergence can be achieved by placing an electrical resistance of preferred value in series with the armature of the first winch motor. It can also be achieved by a pulley system operating between the first winch and the load to effectively multiply the stall torque of the first winch.

In an alternative embodiment, an apparatus for unloading the bed of a light truck comprises a ramp extending from the bed to the ground to form an inclined plane thereto, a load resting on the bed, a winch and cable system attached between the load and the bed, and a stationary anchor to which the load is tethered rearward of the truck. When the truck is driven forward with the winch operated in reverse, the winch, assisted by a means for switching power to the winch on and off to maintain a minimal tension in the cable, controls the movement of the load off the bed and down the ramp.

As this is not intended to be an exhaustive recitation, other embodiments may be learned from practicing the invention or may otherwise become apparent to those skilled in the art.

DESCRIPTION OF THE DRAWINGS

While the invention is particularly pointed out and distinctly described herein, a preferred embodiment is set forth in the following detailed description which may be best understood when read in connection with the accompanying drawings, and in which.

DETAILED DESCRIPTION OF THE PREFERRED EMBODIMENT

The following table defines the symbols used in FIGS. 2-5 and 10-12:

TABLE I

Term Definitions

| Symbol | Defined As |
| --- | --- |
| mg | load weight 100 |
| $T_1$ | loading winch tension 101 |
| $T_2$ | unloading winch tension 102 |
| F | friction force 103 |
| r | winch drum radius 104 |
| θ | ramp incline angle 105 |
| mg sin θ | component force of weight on the ramp 106 |
| $\tau_{1mot}$ | loading winch motor torque curve 107 |
| $\tau_{2mot}$ | unloading winch motor torque curve 108 |
| $\tau_{1gen}$ | loading winch dynamic brake curve 109 |
| $\tau_{3mot}$ | virtual winch motor torque curve 110 |
| $\tau_{3gen}$ | virtual winch dynamic brake curve 111 |
| $\omega_o$ | no-load angular speed 112 |
| $\omega_{o3}$ | virtual winch no-load angular speed 114 |
| ωf | angular speed on flat 115 |
| $\omega_\theta$ | angular speed on incline 116 |
| $\tau_{s1}$ | loading stall torque 117 |
| $\tau_{s2}$ | unloading stall torque 118 |
| $\tau_{s3}$ | virtual stall torque 119 |
| F · r | friction torque 120 |
| (mg sin θ) · r | component force of weight on ramp torque 121 |
| K | emf constant 122 |
| K · ω | emf back force 123 |
| L | motor inductance 124 |
| V | applied voltage 125 |
| i | motor current 126 |
| $R_o$ | armature resistance 127 |
| $R_1$ | added resistance in series 128 |
| R | total resistance 129 |

Figure 12:
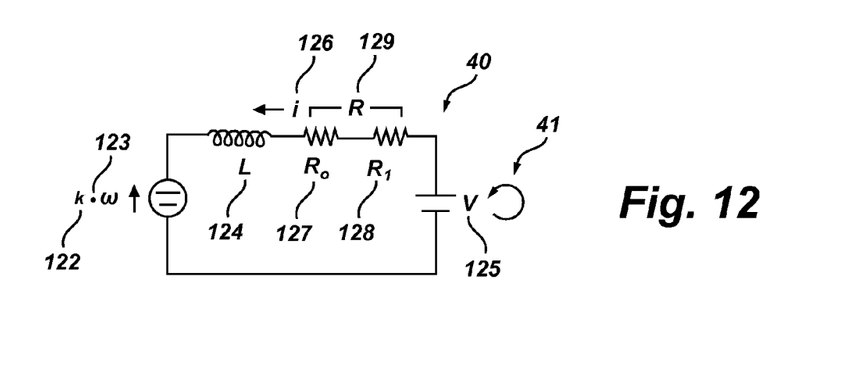
FIG. 12 is a circuit diagram representing a simple DC motor.

FIG. 12 illustrates a circuit diagram for a simple permanent-magnet DC motor 40. A torque (τ) 41 is created by an armature 42 (not shown) carrying a motor current (i) 126 while rotating in the magnetic field of a permanent magnet 44 (not shown). The motor current (i) 126 is related to other circuit elements by Kirchhoff's Law, namely an applied voltage (V) 125, an emf back force (K·ω) 123, and a total resistance (R) 129. The torque (τ) 41 is linearly related to an angular speed (ω) 43 of the DC motor 40 by the following equation:

$$\tau = (\omega_o - \omega)K^2/R$$

Figure 10:
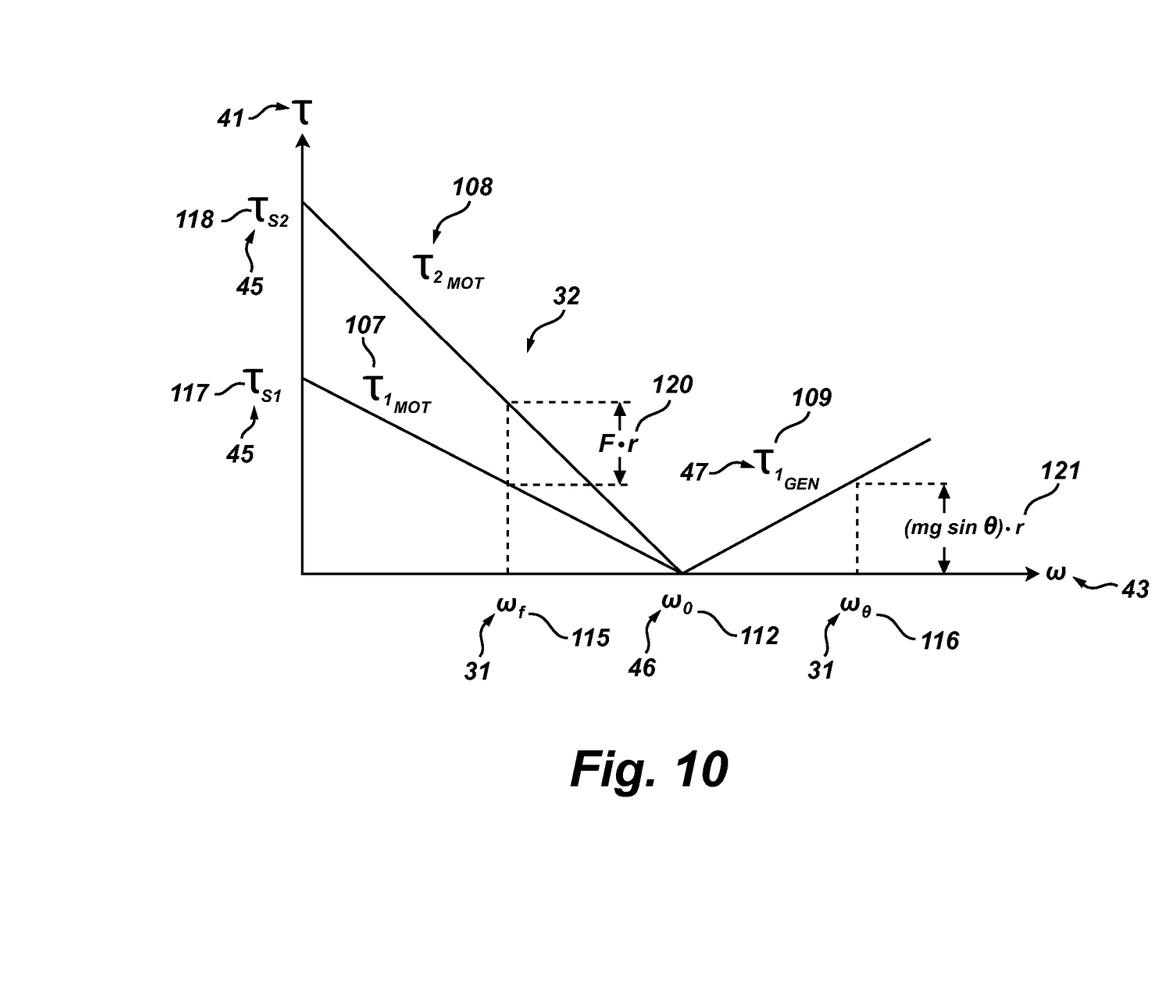
FIG. 10 is a chart, illustrating torque vs. angular speed curves of one embodiment of two cooperating DC motors.
Figure 11:
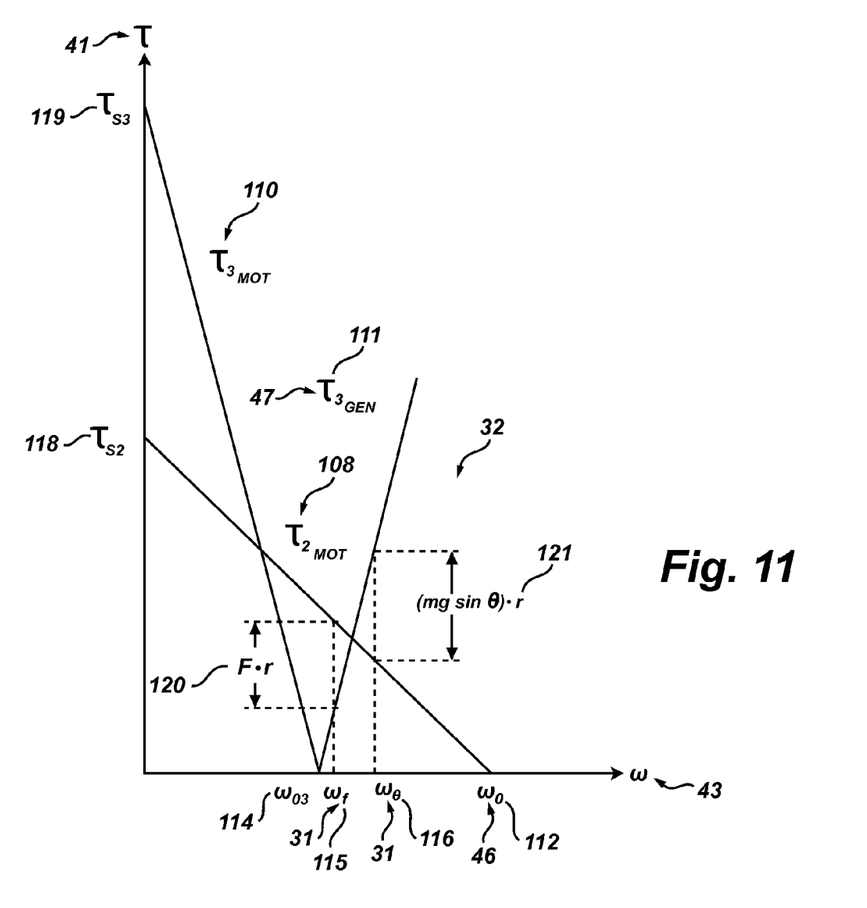
FIG. 11 is a chart, illustrating torque vs. angular speed curves of another embodiment of two cooperating DC motors.

This relationship between torque and speed is charted in the torque vs. angular speed plots 32 of FIGS. 10 and 11. The y-axis of each plot, representing torque (τ), intercepts the plot at a stall torque ($\tau_s$) 45. The x-axis, representing angular speed (ω), intercepts the plot at a no-load speed ($\omega_o$) 46. Both the stall torque ($\tau_s$) 45 and the no-load speed ($\omega_o$) 46, along with an emf constant (K) 122, uniquely characterize any given motor. The stall torque ($\tau_s$) 45 and the no-load speed ($\omega_o$) 46 are defined by the following equations:

$$\tau_s = KV/R$$

$$\omega_o = V/K$$

When the applied voltage (V) 125 is held constant, as in the preferred case using 12-volt battery power, the stall torque ($\tau_s$) 45 will vary inversely with the total resistance (R) 129. At the same time, the no-load speed ($\omega_o$) 46 will remain constant. Thus the slope of the torque vs. angular speed plot 32 can be changed by altering the total resistance (R) 129.

A DC motor is also a generator. When the angular speed ($\omega$) 43 increases beyond the no-load speed ($\omega_o$) 46, mechanical work is done to the motor rather than by the motor. A dynamic brake torque 47 takes effect as current is generated and then dissipated in heat.

The negative slope of the torque vs. angular speed plot 32 thus reverses to a positive slope when the motor transitions to a generator. This change to the slope inclination, like the resistance-dependent case discussed above, sets up a circumstance where the plot slopes may intersect. As the discussion below will show, it is the functional relationship of torque and speed, along with the convergence of slopes of the torque vs. angular speed plots, both unique characteristics of DC motors, which can be exploited to advantage when two winches are cooperatively joined. Part of the novelty of the present invention is in the manner and means of this exploitation.

Figure 3:
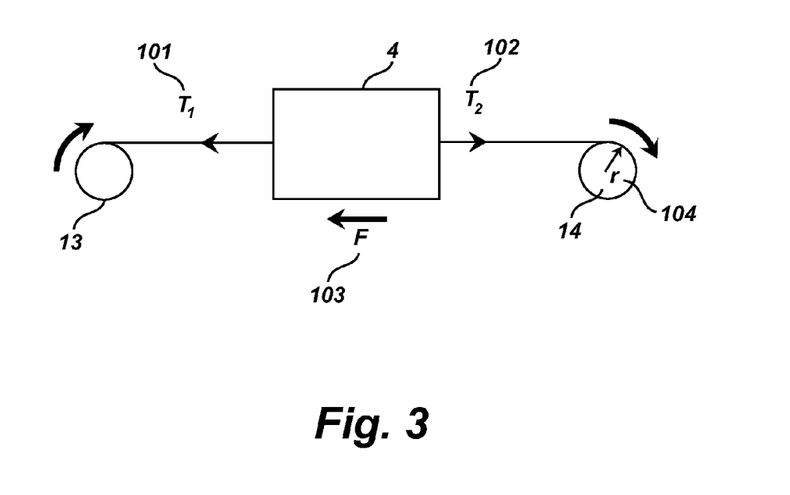
FIG. 3 is a diagram, showing system forces for unloading on a flat surface.
Figure 13:
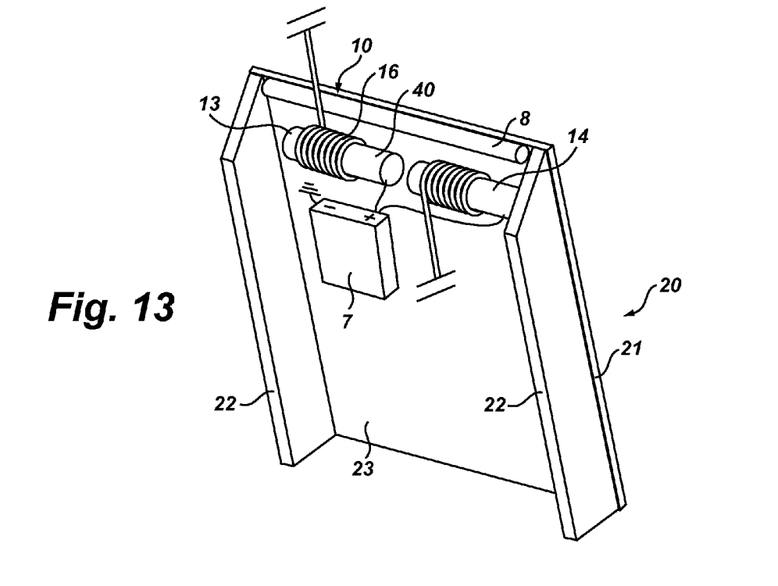
FIG. 13 is a bottom perspective view of a sled component.

In the case of a DC winch 10, the DC motor 40 delivers torque through a shaft and a gearing configuration to a winch drum 16, as shown in FIG. 13. In the preferred embodiment, the gearing configuration is a planetary gear 15 (not shown) having a gear ratio of 136:1. The resultant torque delivered to any load attached to the winch is a function, not only of the step-up gearing, but also of the winch drum radius (r) 104 (FIG. 3). The winch drum radius (r) 104 is effectively a step-down moment arm. For practical purposes, it will be assumed that the winch drum radius (r) 104 is also the radius of the operable cable winding on the drum. In actuality, each cable wrap on the drum reduces the delivered force by 10-12%.

Figure 1:
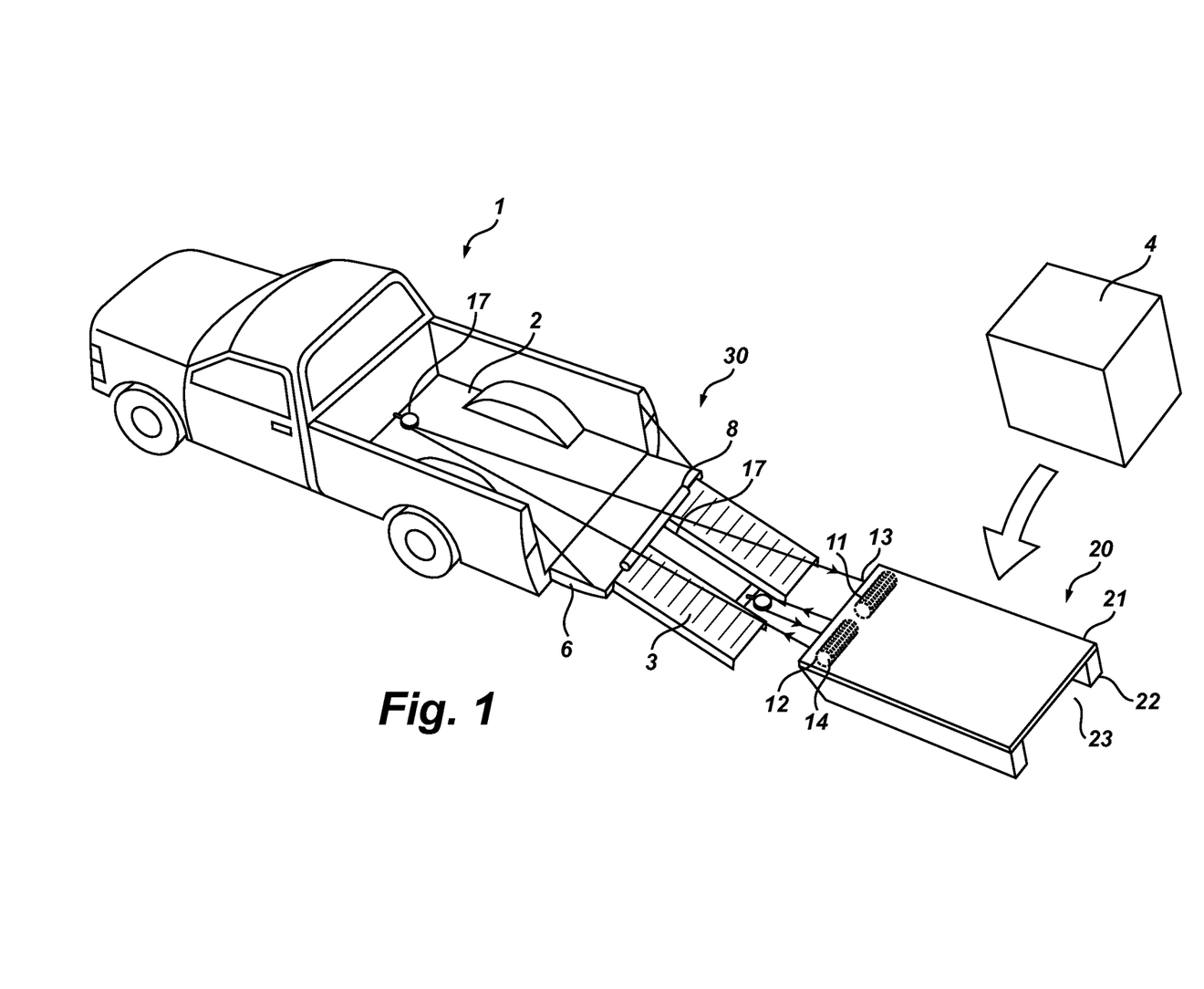
FIG. 1 is a perspective view of the invention, illustrating system components.
Figure 2:
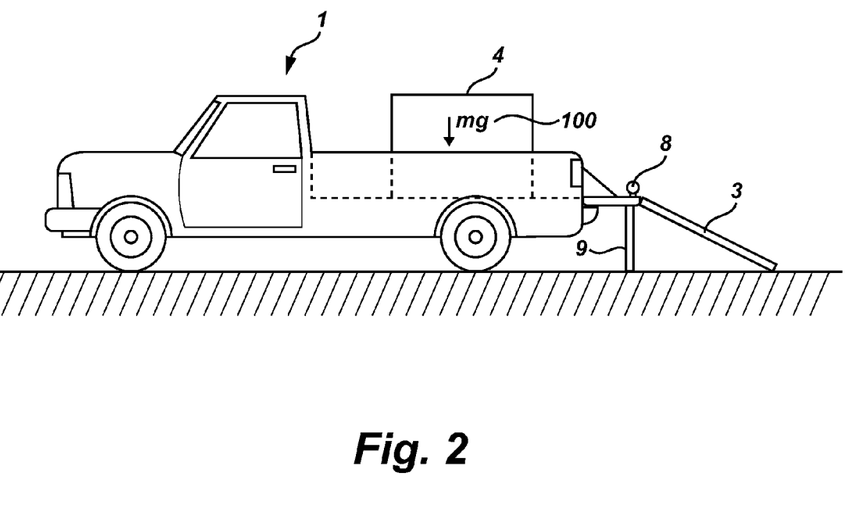
FIG. 2 is an elevation view, showing unloading on a flat surface.

The components of the present invention are best shown in FIG. 1. The truck bed 2 of a light truck 1 can be loaded and unloaded with a load 4 by pulling it up and down a ramp 3. The ramp 3 is supported on one end by a tailgate 6, the other end resting on the ground. The tailgate 6 is supported below by a stiff leg 9 (FIG. 2).

The movement of the load 4 can be facilitated by a sled 20. The sled 20 is comprised of a platform 21 attached above at least two rails 22. The rails 22 function to reduce dragging friction by minimizing the contact area with the truck bed 2. The rails 22 have the additional function of providing a housing space 23 beneath the platform 21. As shown in FIG. 13, the housing space 23 is preferably sufficient to accommodate at least one DC winch 10 mounted underneath the platform 21 together with a battery 7 supplying power thereto. Alternatively, the at least one DC winch 10 and the battery 7 can be mounted above the platform 21, thereby lowering the profile requirement for the housing space 23. In another alternative arrangement, the sled 20 can be eliminated all together by mounting the at least one DC winch 10 on a bulkhead of truck bed 2. It is notable that the sled 20 and the ramp 3 are not permanent installations on light truck 1 and can be removed to permit other uses of truck bed 2.

Referring to FIG. 1, the sled 20 with load 4 mounted thereon is pulled onto the truck bed 2 by a first winch and cable system 11, also known as a loading winch 13. Similarly, the loaded sled 20 can be dismounted by a second winch and cable system 12, also known as an unloading winch 14. The loading winch 13 and the unloading winch 14 operate through pulleys 17 attached at the extreme forward and rearward ends of truck bed 2, as extended by tailgate 6 and ramp 3. The pulleys 17 provide anchor points for the advancement of the load in either direction, onto or off of, the truck bed 2. Rollers 8 may be placed at the end of the tailgate 9 and under the forward lip of the platform 21 (FIG. 13) in order to smoothly transition the cable around bends.

The loading winch 13 has the capability of, at least, forward and reverse directions under power. The powered reverse direction has the same torque vs. angular speed plot 32 as the powered forward direction. The unloading winch 14 has the capability of, at least, a forward direction under power and a free-wheeling clutch. Disengagement of the free-wheeling clutch allows the cable to be drawn off the winch drum with minimal resistance.

The present invention requires that the two winches work together to result in an avoidance of an uncontrolled movement of the load, and, particularly, of a run-away ramp descent under gravity. Consequently, a means for cooperating 30 is required; otherwise, the two winches would either deadlock, or resist each other to the point of catastrophic failure. The means for cooperating 30 has two modes. In the loading mode, the loading winch 13 is engaged to draw the loaded sled 20 up the ramp 3 and onto the is truck bed 2. The unloading winch 14, meanwhile, is allowed to free-wheel, the loading winch drawing cable off the unloading winch drum for future retrieval thereto. During the movement up the ramp and onto the truck bed, the force of the loading winch 13 is counterbalanced by the forces of gravity and friction. Any buffering interaction with the unloading winch 14 is not needed in this case.

It is in the second mode of the means for cooperating 30 that balancing interaction of the two winches is encountered, as best illustrated in FIGS. 2 to 5. There are two circumstances of this second mode. In the first circumstance, the sled 20 with load 4 is moving horizontally rearward on the truck bed 2 with the loading winch 13 in reverse and the unloading winch 14 reeling-in. This is depicted in FIG. 2. The companion diagram, FIG. 3, shows that an unloading winch tension ($T_2$) 102 is opposed by a loading winch tension ($T_1$) 101 and a friction force (F) 103. The friction force is a function, among other things, of a load weight (mg) 100. A constant velocity movement occurs when the parameters meet the following requirement:

$$T_2 = T_1 + F$$

The serendipitous part of using DC motors is that the two winches can self-adjust to achieve a common velocity when conditions for a means for equalizing speeds 31 is met. The common velocity meeting the above parameter conditions, for example, is represented in FIG. 10 at the ordinate value of angular speed on flat ($\omega_f$) 115. At this coordinate, the difference in the torques at the intercepts of the ordinate with an unloading winch motor torque curve ($\tau_{2mot}$) 108 and a loading winch motor torque curve ($\tau_{1mot}$) 107 is equal to a friction torque (F·r) 120. The condition for the means for equalizing speeds 31 is that the torque vs. angular speed plots 32 for the two winches, represented by the above curves, must converge at some point. The convergence, under the right slope inclinations, not only provides a range of net torques to satisfy variable operating parameters, but also provides a saddle point for stability. In other words, an incremental increase in speed must result in a decrease of the net torque operating on the system (the load) and a decrease in speed must, at the same time, result in an increase of the net torque; if otherwise, the system would experience an unbalanced torque and would there under accelerate to become unstable.

The above development is, of course, an over-simplification. The actual torque meeting the equation parameters involves, not just the motor, but other factors such as gear ratios, drum sizes, and mechanical efficiencies. Since these factors can be assumed to be invariable over the operating range, however, the description serves as a valid representation of an achievable equilibrium state.

Figure 4:
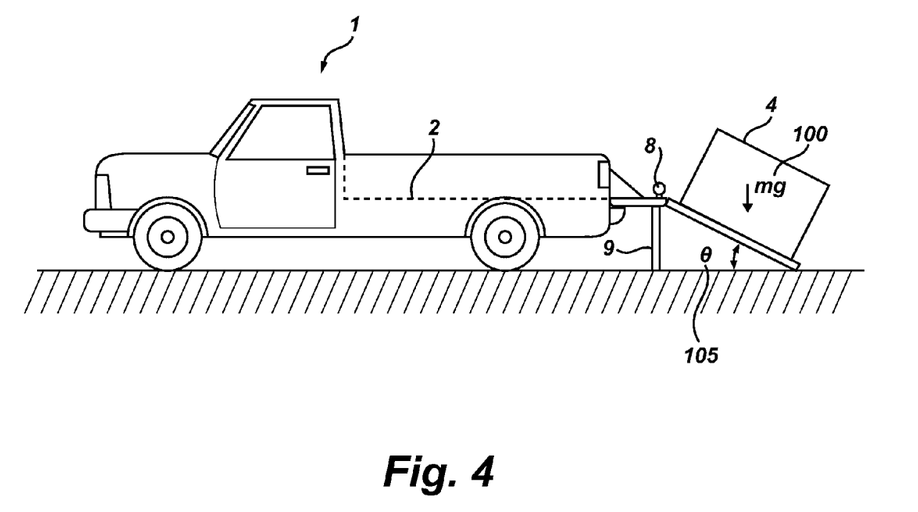
FIG. 4 is an elevation view, showing unloading on an incline.
Figure 5:
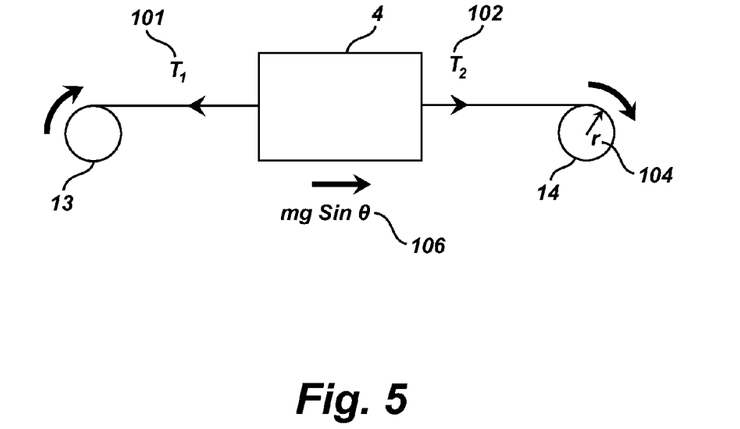
FIG. 5 is a diagram, showing system forces for unloading on an incline.

The second circumstance of the second mode of the means for cooperating 30 is shown in FIG. 4. In this circumstance, the sled 20 with load 4 is descending the ramp 3 at a ramp incline angle (θ) 105. The companion diagram, FIG. 5, shows that the loading winch tension ($T_1$) 101 is opposed by both the unloading winch tension ($T_2$) 102 and a component force of weight on the ramp (mg sin θ) 106. The constant velocity movement will occur under the following parameter conditions:

$$T_1 = T_2 + mg \sin \theta$$

Referring to FIG. 10 again, the required velocity for ramp descent occurs at the ordinate value of angular speed on incline ($\omega_\theta$) 116. At this coordinate, the unloading winch 14 has plateaued at the no-load angular speed ($\omega_o$) 112 and the loading winch 13 has progressed on the loading winch dynamic brake curve ($\tau_{1gen}$) 109 to reach a value of dynamic brake torque 47 equivalent to a component force of weight on ramp torque [(mg sin θ)·r] 121. The curves in this case also demonstrate a convergence leading to a stable state of motion where the condition for the means for equalizing speeds 31 is again satisfied. The plot shows that an incremental increase in speed results in a higher brake torque which acts to slow the speed, and visa versa for a decrease.

The two winches in the configuration corresponding to FIG. 10 are identical, except that the loading winch 13 is provided with an added resistance in series ($R_1$) 128. The added resistance in series ($R_1$) 128 combines with an armature resistance ($R_o$) 127 to advance the total resistance (R) 129 to a value greater than that of the armature resistance ($R_o$) 127 possessed by unloading winch 14. This has the effect on respective stall torques 45, namely a loading stall torque ($\tau_{s1}$) 117 and an unloading stall torque ($\tau_{s2}$) 118, as follows:

$$\tau_{s1} < \tau_{s2}$$

The added resistance results in altering the inclination of the slopes of the two curves, the loading winch motor torque curve ($\tau_{1mot}$) 107 and the loading winch dynamic brake curve ($\tau_{1gen}$) 109. The change in inclination results in a convergence with the curve of the unloading winch 14, as discussed above, which convergence happens to occur at the no-load angular speed ($\omega_o$) 112. It is also apparent, from FIG. 10, that the equilibrium speeds, namely the angular speed on flat ($\omega_f$) 115 and the angular speed on incline ($\omega_\theta$) 116, are a function of the degree of inclination of the curves, which is adjustable by means of the added resistance in series ($R_1$) 128. In other words, the added resistance in series ($R_1$) 128 is the mechanism by which speed of movement can be adjusted for any particular load scenario. The minimum value of the added resistance in series ($R_1$) 128 would be that satisfying the inertial, or stand-still, condition:

$$\tau_{s2} - \tau_{s1} \geq (F \cdot r)_{inertial}$$

Figure 6:
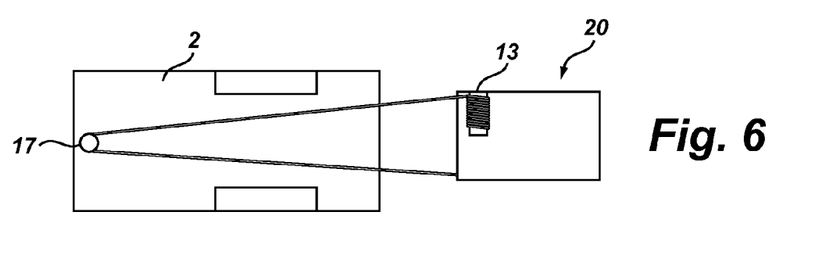
FIG. 6 is a partial top view diagram, showing one embodiment of a loading system.
Figure 7:
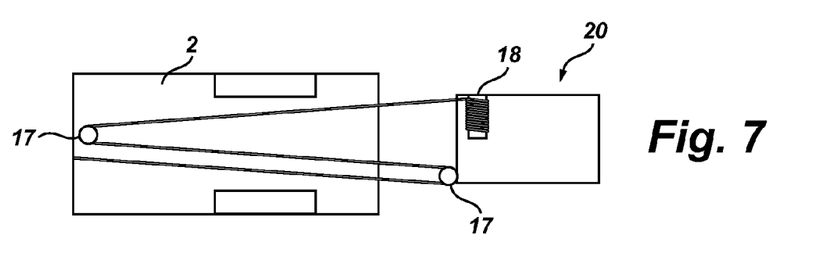
FIG. 7 is a partial top view diagram, showing another embodiment of a loading system.
Figure 8:
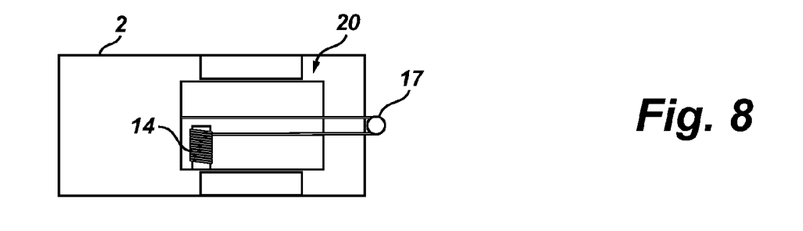
FIG. 8 is a partial top view diagram, showing one embodiment of an unloading system.

The rigging diagrams for the loading winch 13 and the unloading winch 14 are shown in FIGS. 6 and 8. In the preferred embodiment, the rigging for the loading winch 13 would include a third pulley 17 attached to the sled 20, such that a 2:1 mechanical advantage is thereby provided. This arrangement is illustrated in FIG. 7. From the perspective of the load 4 on the sled 20, this would appear as if there were a virtual loading winch 18 acting on it, wherein the stall torque 45 would be twice that of actual and the no-load speed 46 would be half that of actual. This arrangement is shown in FIG. 11, where a virtual winch motor torque curve ($\tau_{3mot}$) 110 demonstrates a steeper slope, ranging from a virtual winch stall torque ($\tau_{s3}$) 119 on one axis to a virtual winch no-load angular speed ($\omega_{o3}$) 114 on is the other axis, the values double and half, respectively, as discussed above. The condition for converging slopes is provided by a virtual winch dynamic brake curve ($\tau_{3gen}$) 111, mirroring the slope of the motor curve. Since the condition is satisfied, the rigging scenario of FIG. 7 provides an alternate means for equalizing speeds 31.

The equilibrium speeds shown in FIG. 11, namely the angular speed on flat ($\omega_f$) 115 and the angular speed on incline ($\omega_\theta$) 116, are more closely nested and generally lower than in the configuration of FIG. 10. This means that greater control over the movement is provided in this scenario, albeit at the expense of motor stress in the form of greater generation of heat. For sufficiently heavy loads, the rigging scenario of FIG. 6 with the incremental resistance factor might be preferable. It should be apparent, however, that the speed of movement of the load, as well as the dissipative effect of the dynamic braking, can be adjusted by further manipulating the mechanical advantage of loading winch 13.

In the preferred embodiment, the loading winch 13 and the unloading winch 14 are 2500-3000 lb ATV winches. This rating provides sufficient muscle to lift a camper onto a pickup truck. The added resistance in series ($R_1$) 128 can be supplied by a potentiometer, wherein the resistance is rendered adjustable. The two winches need not be identical. With the proper choice of emf constant (K) 122, the torque vs. angular speed plots 32 may exhibit the requisite intersecting slopes without resort to further artifice.

Figure 9:
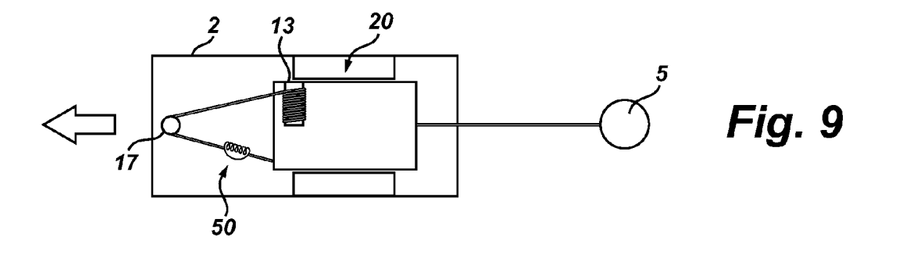
FIG. 9 is a partial top view diagram, showing another embodiment of an unloading system.

An alternate embodiment of the present invention is shown in the rigging diagram of FIG. 9. In this case, the unloading winch 14 is eliminated and unloading is achieved by deadheading the loaded sled 20 to a stationary anchor 5, such as a tree. The light truck 1 is then driven out from underneath the load with the loading winch 13 engaged in reverse. Because it would be nearly impossible, under normal circumstances, to match the speed of the truck to that of the winch, the truck speed will be slower. This gives rise to the need for tension control in the first winch and cable system 11. If the cable is fed too quickly, it would tend to gather in a "birds nest" entanglement.

Figure 14:
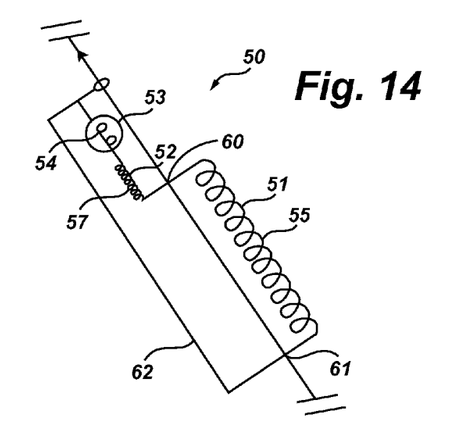
FIG. 14 is a diagram showing a tension switch in a closed position.
Figure 15:
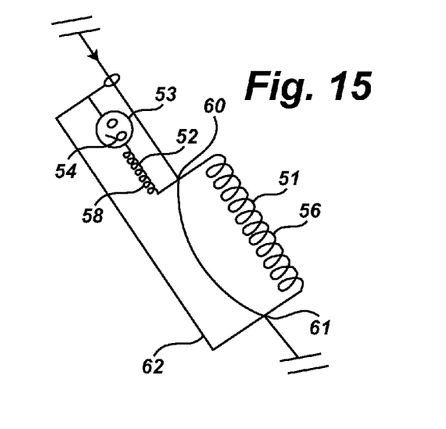
FIG. 15 is a diagram showing a tension switch in an open position.

To avoid this, the alternate embodiment provides a means for switching 50 to stop the loading winch 13 by switching off the power. The means for switching 50 is attached between the sled 20 and the standing end of the cable, as shown in FIG. 9. Referring to FIGS. 14 and 15, the means for switching 50 is comprised of a first spring 51 attached between a distal point 60 and a proximal point 61 on the cable. The first spring 51 has a first spring stretched position 55 corresponding to the cable being tight between the distal point 60 and the proximal point 61, indicating tension in the cable, and a first spring relaxed position 56 corresponding to a slack there between, indicating relief from tension. The means for switching 50 is further comprised of a second spring 52 attached between the distal point 60 and an electrical switch 53. The electrical switch 53 is rigidly fixtured along the cable by bracket 62 such that second spring 52 is in a second spring relaxed position 57 when the first spring 51 is in the first spring stretched position 55 and in a second spring stretched position 58 when the first spring 51 is in the first spring relaxed position 57. Switch contacts 54 of the electrical switch 53 are held open when the second spring 52 is in the second spring stretched position 58 while being otherwise closed. Power to the loading winch 13 is cut off when the switch contacts 54 are open.

The disclosure herein has demonstrated several ways that a pair of DC winches may be deployed cooperatively to load and unload a light truck without the added expense and complication of external control mechanisms. The systems presented leave the truck unencumbered for other uses. Various other benefits may ultimately be discovered. While a particular form of the invention has been illustrated and described, it will be apparent that various modifications can be made without departing from the spirit and scope of the invention. Accordingly, it is not intended that the invention be limited, except as by the appended claims.

What is claimed is:

1. An apparatus for loading and unloading the bed of a light truck, comprising:
   a ramp extending from the bed to a ground surface to form an inclined plane thereto;
   a load resting on the ground proximate to the ramp;
   first winch and cable system attached between the load and the bed and configured to pull the load up the ramp and across the bed, said first winch and cable system powered by a first motor characterized by a first torque versus angular speed plot;
   a second winch and cable system attached between the load and the ramp and configured to pull the load off the bed and onto the ramp, said second winch and cable system powered by a second motor characterized by a second torque versus angular speed plot; and
   a means for cooperating operative between the first and second winch and cable systems to regulate the movement of the load along the bed and ramp and against frictional and gravitational forces encountered thereupon exclusively by self-adjustment of the systems, said means comprising a convergence of the first and second torque versus angular speed plots at a preferred speed, wherein the means for cooperating further comprises the second winch free-wheeling while the first winch is pulling and the first winch engaging in reverse while the second winch is pulling.

2. The apparatus of claim 1, wherein the first and second motors are permanent-magnet DC motors.

3. The apparatus of claim 1, wherein the convergence of plots is achieved by adding resistance of a preferred value in series with an armature of the first motor.

4. The apparatus of claim 1, wherein the preferred speed is such that ramp descent is controlled in a manner to prevent load damage.

5. The apparatus of claim 3, wherein the preferred value of resistance is sufficient for the second winch to overcome inertial resistance of the load from its rest position on the bed.

* * * * *